United States Patent
Reeves et al.

(10) Patent No.: US 9,519,867 B1
(45) Date of Patent: Dec. 13, 2016

(54) OPTIMIZING A USER EXPERIENCE

(71) Applicant: Sprint Communications Company L.P., Overland Park, KS (US)

(72) Inventors: Raymond Emilio Reeves, Olathe, KS (US); Jason Norwood Ward, Lee's Summit, MO (US); Tuan Quoc Tran, Olathe, KS (US); Lauriann Lowe Hebb, Palm City, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 859 days.

(21) Appl. No.: 13/665,099

(22) Filed: Oct. 31, 2012

(51) Int. Cl.
*G06N 5/02* (2006.01)
*G06F 17/00* (2006.01)
*G06N 7/06* (2006.01)
*G06F 17/30* (2006.01)

(52) U.S. Cl.
CPC ........... *G06N 7/06* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 2004/0210661 A1* | 10/2004 | Thompson | 709/228 |
| 2006/0184800 A1* | 8/2006 | Rosenberg | 713/186 |
| 2007/0203872 A1* | 8/2007 | Flinn et al. | 706/62 |
| 2009/0037355 A1* | 2/2009 | Brave et al. | 706/45 |
| 2009/0063248 A1* | 3/2009 | Chong | G06Q 30/0201 705/7.29 |
| 2010/0169343 A1* | 7/2010 | Kenedy et al. | 707/758 |
| 2011/0022477 A1* | 1/2011 | Hatridge et al. | 705/14.67 |

OTHER PUBLICATIONS

Parkhomenko et al., "Personalization using Hybrid Data Mining Approaches in E-Business Applications", 2004, American Association for Artificial Intelligence. pp. 1-6.*

* cited by examiner

*Primary Examiner* — Paulinho E Smith

(57) ABSTRACT

Systems, methods, and computer-readable media for optimizing a user experience are provided. The method includes optimizing a user experience using clusters, user preferences, or a combination thereof. Clusters may be created based on, for example, user behaviors, or actions, exhibited by a user. User preferences may be established for each cluster in order to further customize the clusters. The clusters may be continuously monitored such that if changes are necessary they may be immediately applied such as a user exhibited different behavior and requiring association with a new cluster. This information, or clustering, may be utilized to predict user satisfaction such that more positive user experiences are encountered and negative user experiences are, to the extent possible, avoided, or at least lessened.

20 Claims, 6 Drawing Sheets

OPTIMIZING A USER EXPERIENCE

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, optimizing a user experience. Utilizing embodiments hereof, clusters may be utilized to optimize a user experience. Clusters may be created based on, for example, user behavior (e.g., data downloaded by a user on, for example, a mobile device, voice usage on the mobile device, text messaging usage on the mobile device, etc.). User preferences may be established for each cluster in order to "fine-tune" the clusters. The clusters may be continuously monitored such that if changes are necessary they may be immediately applied. For instance, if, over time, User A exhibits behavior that is in line with a cluster different than the cluster with which he is currently associated, User A may be relocated to the more appropriate cluster. This information, or clustering, may be utilized to predict user satisfaction such that more positive user experiences are encountered and negative user experiences are, to the extent possible, avoided, or at least lessened.

BRIEF DESCRIPTION OF THE DRAWINGS

Illustrative embodiments of the present invention are described in detail below with reference to the attached drawing figures, and wherein.

DETAILED DESCRIPTION

Figure 1:
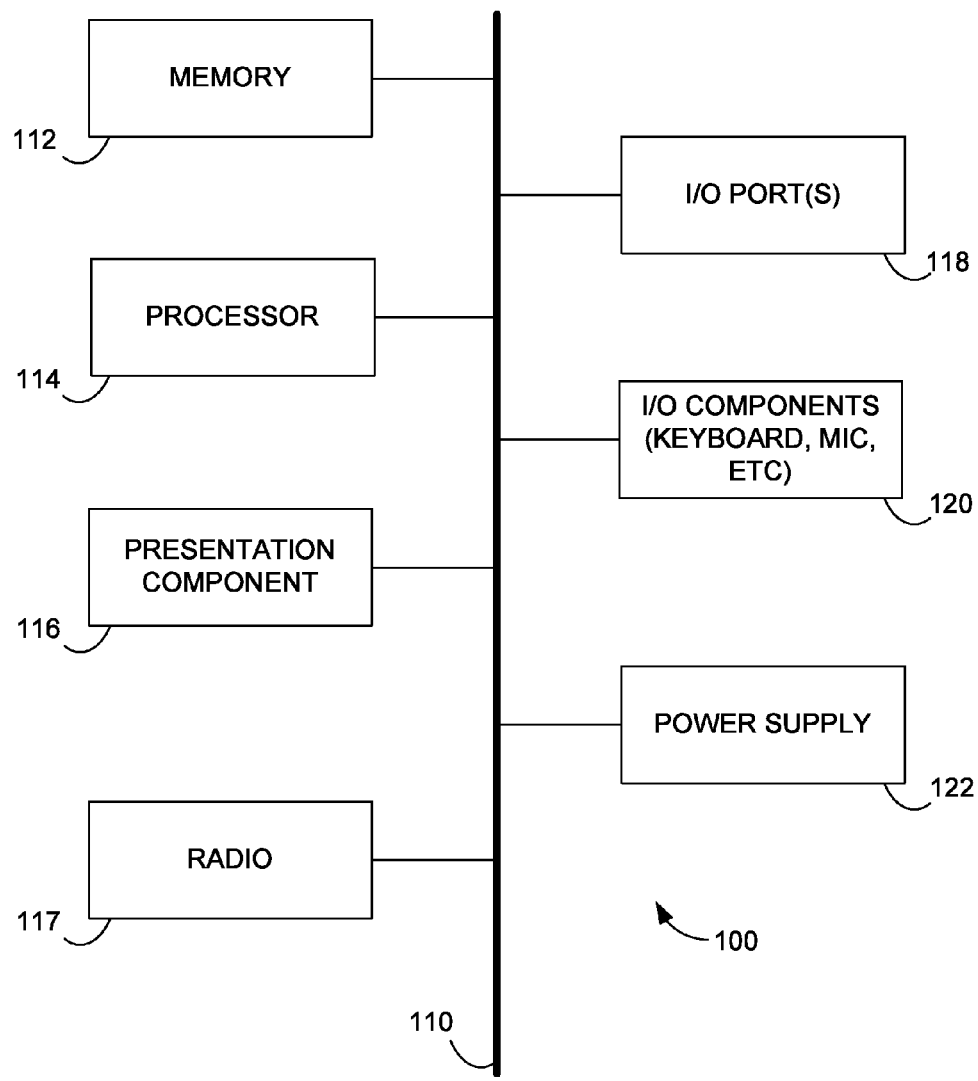
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for optimizing a user experience. Utilizing embodiments hereof, clusters may be utilized to optimize a user experience. Clusters may be created based on, for example, user behavior (e.g., data downloaded by a user on, for example, a mobile device, voice usage on the mobile device, text messaging usage on the mobile device, etc.). User preferences may be established for each cluster in order to "fine-tune" the clusters. The clusters may be continuously monitored such that if changes are necessary they may be immediately applied. For instance, if, over time, User A exhibits behavior that is in line with a cluster different than the cluster with which he is currently associated, User A may be reassigned to the more appropriate cluster. This information, or clustering, may be utilized to predict user satisfaction such that more positive user experiences are encountered and negative user experiences are, when possible, avoided or lessened.

Accordingly, in one aspect, the present invention is directed to one or more computer-readable storage media having computer-executable instructions embodied thereon that, when executed, perform a method for optimizing a user experience. The method includes identifying one or more users that are associated with a plurality of user behaviors. The plurality of user behaviors is useful in order to identify one or more users that act similarly. Based on the plurality of user behaviors, one or more user clusters are created. A set of user preferences are created within each of the one or more user clusters. The user preference may indicate features that are, for example, required, advantageous, indifferent, or disadvantageous to a user. Based on the set of user preferences within each of the one or more user clusters, a satisfaction level for a first user is predicted.

In another aspect, embodiments of the present invention are directed to one or more computer-readable storage media having computer-executable instructions embodied thereon that, when executed, perform a method for optimizing a user experience. The method includes identifying one or more users that are associated with a plurality of user behaviors. Based on the plurality of user behaviors, one or more user clusters is created. A set of user preferences is created within each of the one or more user clusters. The set of user preferences may indicate if a feature is required, advantageous, indifferent, or disadvantageous to a user. A first user and a device associated with the first user are identified. The first user is associated with a first cluster of the one or more user clusters. Based on the plurality of user behaviors of a first subset of one or more users associated with the first cluster, a satisfaction level for the first user is predicted and a recommended action is communicated to the first user, where the recommended action is intended to increase the satisfaction level of the first user.

In yet another aspect, a system for optimizing a user experience. The system includes a computing device associated with one or more processors and one or more computer storage media and an optimization engine. The optimization engine comprises a manager component configured for managing an optimization system and distributing user information to one or more other components of the optimization system; an analysis component for analyzing the user information to provide recommended cluster groupings of one or more users associated with the user information and recommendation actions to maintain user satisfaction; a communicating component for communicating recommendation actions to one or more user devices; an updating component for updating the cluster groupings based on updated user information; and a prediction component for predicting user satisfaction.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third Generation Mobile Telecommunications
    4G Fourth Generation Mobile Telecommunications
    CD-ROM Compact Disk Read Only Memory
    CDMA Code Division Multiple Access
    GPRS General Packet Radio Service
    GSM Global System for Mobile communications: originally from Groupe Spécial Mobile
    DVD Digital Versatile Discs
    EEPROM Electrically Erasable Programmable Read Only Memory
    HLR Home Location Register
    HSDPA High-Speed Downlink Packet Access
    LTE Long Term Evolution
    PC Personal Computer
    PDA Personal Digital Assistant
    RAM Random Access Memory
    ROM Read Only Memory
    TDMA Time Division Multiple Access
    UMTS Universal Mobile Telecommunications System
    VOIP Voice Over Internet Protocol
    WiMAX Worldwide Interoperability for Microwave Access
    Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for optimizing a user experience. Accordingly, embodiments of the present invention improve a user's experience and monitor user behaviors in order to promote positive experiences and reduce negative experiences. This user optimization may be provided through the use of clusters, user preferences, or a combination thereof. Clusters, as used herein, generally refer to a grouping of users that includes one or more users that share a predetermined number of similar user behaviors. For example, Cluster A may be comprised of users that rarely use voice features of a mobile device (e.g., less than 10% of the uses of the mobile device), are associated with a high volume of downloaded data on their mobile device, and frequently access various applications on their mobile device (e.g., search engines, social media applications, weather applications, etc.) while Cluster B may be comprised of users that frequently use the voice features of their mobile device (e.g., more than 80% of the uses of the mobile device) and rarely download data or access applications.

Such clustering may be accomplished utilizing user behavior information. User behavior information, as used herein, generally refers to actions taken by a user on a user device. User behavior information may include, but is not limited to, application termination frequency, application dormancy/activity requested/allowed, application uninstallation patters, etc. Clustering may also rely on additional user information such as demographics. Additionally, in embodiments, clusters may be created for users based on a mobile device associated with the user, a service plan (i.e., a telecommunications usage plan or rate plan), or a combination thereof. For instance, users possessing a basic mobile device equipped with voice functionality and other basic mobile device features are not likely to exhibit the same behaviors as, for example, users possessing a mobile device equipped with extensive data functionality such as, for example, a smart phone. Clustering will be further described in detail hereinafter.

Figure 2:
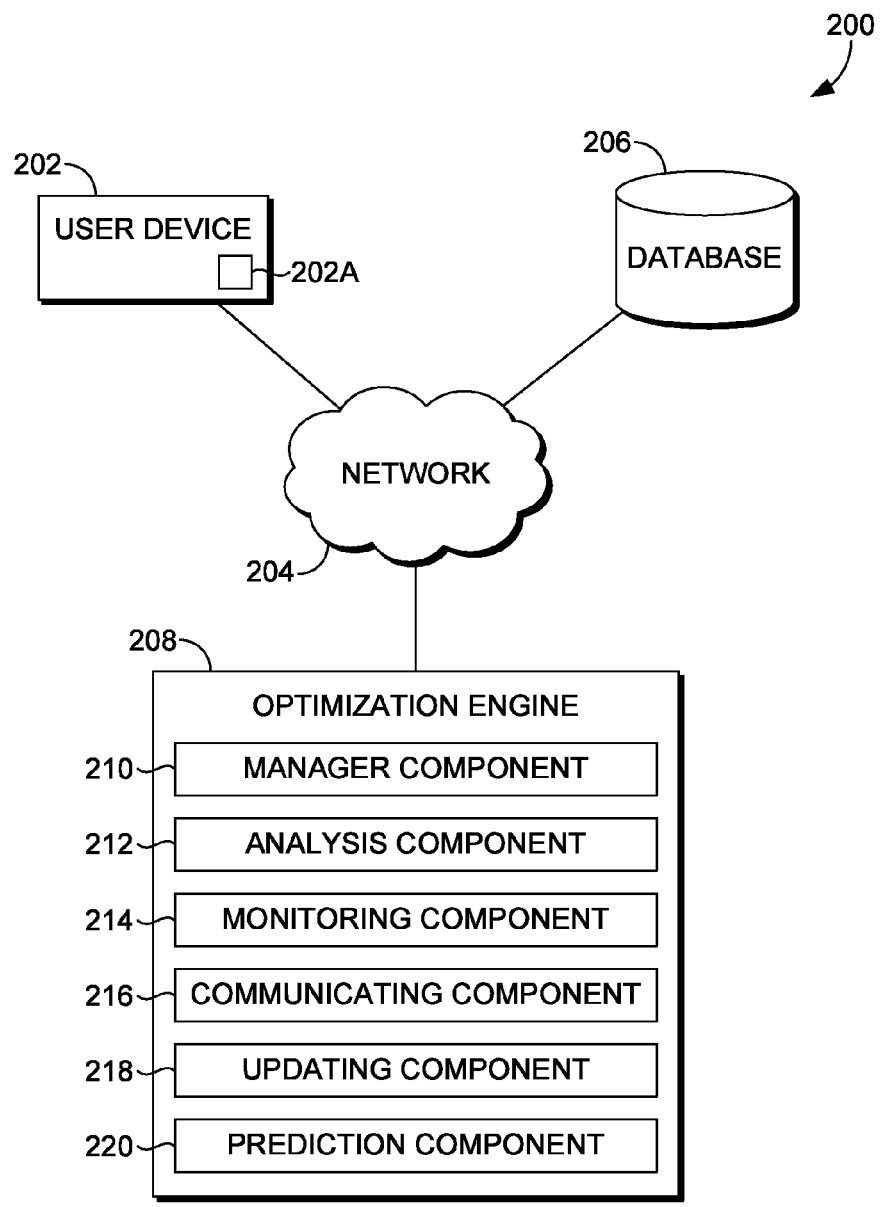
FIG. 2 is a schematic view of an exemplary network environment suitable for use in implementing embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 202 may communicate with other devices, such as mobile devices, servers, etc. The user device 202 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 202 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 202 may include an optimization agent 202A. An optimization agent, as will be described in further detail below, may be in communication with other computing devices (e.g., a mobile device(s), a server(s), a personal computer(s), etc.) to assist in optimizing a user experience. The optimization agent 202A may, for example, be configured to receive instructions on how to increase user satisfaction or actions to take to increase user satisfaction. The optimization agent 202A may be any component of a user device that is capable of communicating with other computing devices.

The user device 202 can utilize network 204 to communicate with other computing devices (e.g., a mobile device (s), a server(s), a personal computer(s), etc.). In embodiments, the network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. Network 204 can be part of a telecommunications network that connects subscribers to their immediate service provider. In embodiments, the network 204 can be associated with a telecommunications provider that provides services to user devices, such as user device 202. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

As previously mentioned, user information (i.e., user behavior information) may be utilized to optimize a user experience. The user information may be accessed and/or received from database 206. Database 206 may be any device capable of storing, communicating, and allowing access to user information. The user information may be accessed by or received at the optimization engine 208. The optimization engine 208 may include, among other components, a manager component 210, an analysis component 212, a monitoring component 214, a communicating component 216, an updating component 218, and a prediction component 220.

The manager component 210 may be configured for, among other things, managing the system 200. In particular, the manager component 210 may access and track the user information from database 206. Alternatively, the manager component 210 may receive the user information from database 206. The manager component 210 may be further configured to share the user information with additional components of the optimization engine 208.

The user information, as briefly described above, may be utilized to create/identify clusters and to categorize one or more users within the clusters. Initially, users may be organized into clusters using a variety of information. For example, a user may be associated with a cluster initially based on user demographics, a user device associated with the user, a rate plan associated with the user device, or the like. New users (e.g., a user that has just recently become a subscriber to a telecommunications service) are more likely to be associated with clusters based on data of this type. Existing users (e.g., users that have already established an account with the telecommunications service) are more likely to be associated with clusters utilizing more detailed information related to user behaviors. User behaviors may include, but are not limited to, voice usage, data usage, downloads of applications, accessing e-mails, executing applications, using a camera, sending pictures, sending and/or receiving text messages, playing games, and the like. Existing users may also be associated with clusters utilizing the basic user information including demographics, a device, and a rate plan. Alternatively, existing users may be associated with a cluster using both the basic user information and the user behavior information.

The user information may be analyzed by, for example, the analysis component 212 in order to associate clusters with one or more users. As described in detail above, the analysis component 212 may associate a user with a cluster based on basic user information, user behavior information, or a combination thereof.

Once users are associated with a cluster, the optimization engine 208 continuously monitors the cluster groupings utilizing, for example, the monitoring component 214. The monitoring component 214 is configured for, among other things, continuously monitoring the activity of users within the cluster groupings in order to identify if a user should be reassigned to a different cluster. For instance, a user may have recently started sending three times as many photos as they were sending. This user may be better suited in a different cluster. In embodiments, the analysis component 212 may also be configured to continuously monitor the system 200 and reassign users to different clusters.

Figure 3:
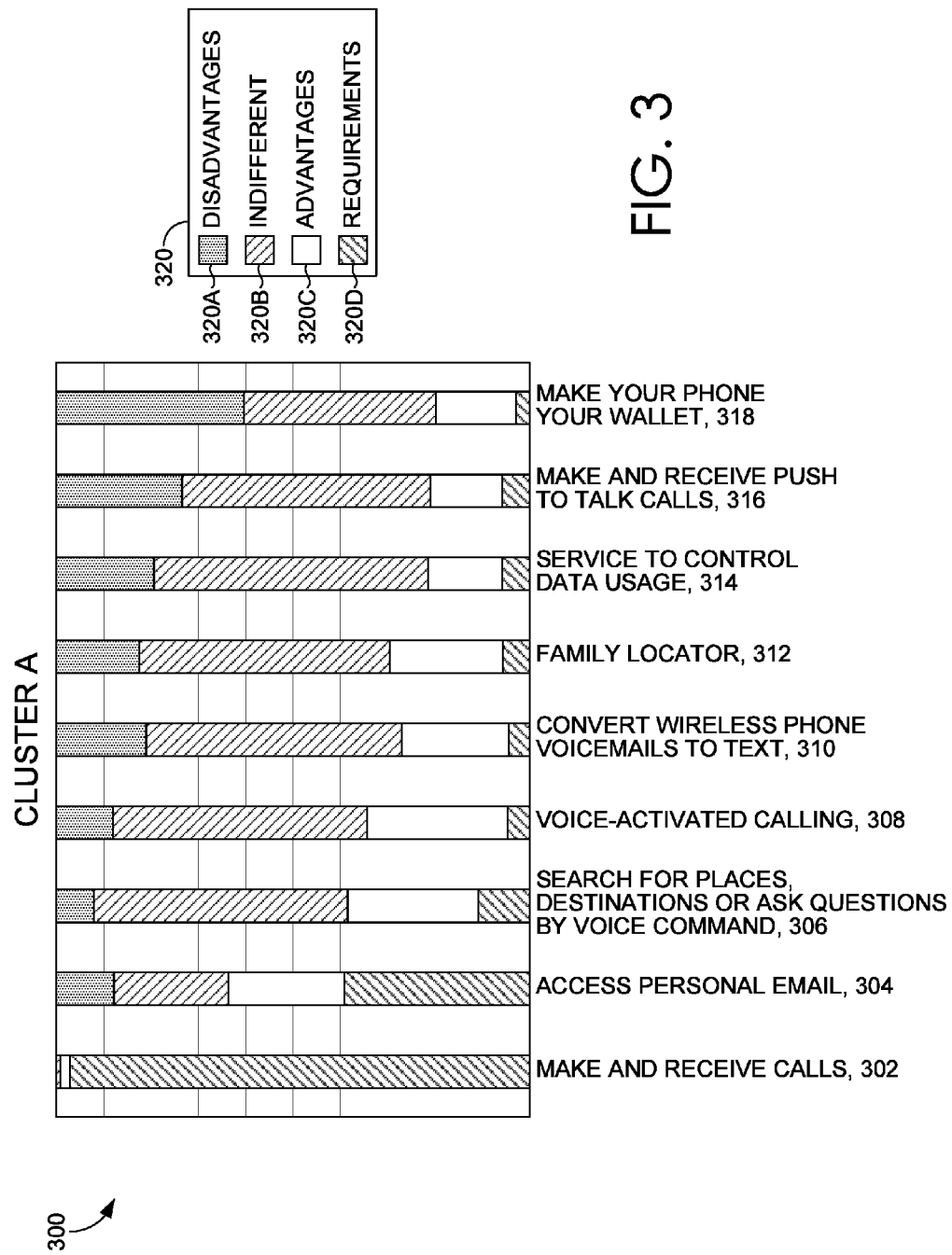
FIG. 3 provides a first exemplary diagram illustrating user preferences of a first cluster, in accordance with an embodiment of the present invention.
Figure 4:
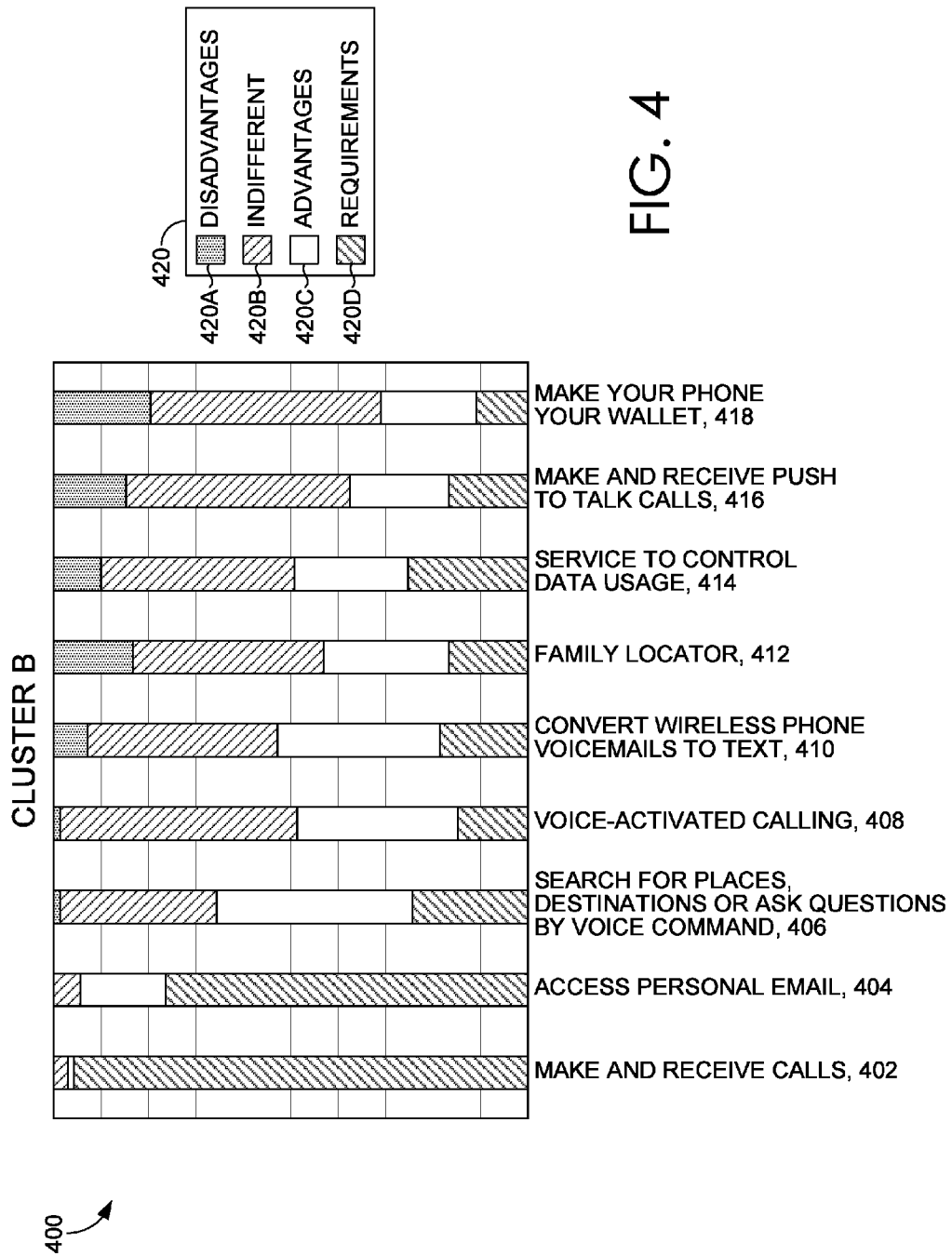
FIG. 4 provides a second exemplary diagram illustrating user preferences of a second cluster, in accordance with an embodiment of the present invention.

Clustering is not the only way to optimize a user experience. The cluster groupings may be "fine-tuned" by establishing customized user preferences for each cluster. The user preferences for each cluster may be organized into distinct categories. In an embodiment, user preferences for certain features related to their user experience may be categorized into one of the following preference categories: Required, Advantageous, Indifferent, and Disadvantageous. The features that are organized into the preference categories represent a variety of things including, but not limited to, options available to a user, options available on a user device, rate plan options, user device functionality, and the like. Some exemplary features include making and receiving calls, accessing personal emails, searching using voice commands, converting voicemails to text, making a user device serve as a wallet, making and receiving push to talk calls, family locator functionality, and the like. The features may be organized into the preference categories based on user feedback (e.g., survey responses). FIGS. 3 and 4 provide exemplary clusters with various features organized into user preference categories.

FIG. 3 provides a graphical representation 300 of a Cluster A and the user preferences associated with Cluster A. The bar graph illustrates exemplary user responses related to certain features 302-318. Legend 320 illustrates the features 302-318 may be organized as a disadvantage 320A, indifferent 320B, an advantage 320C, or a requirement 320D. For instance, almost every user in Cluster A has designated that the ability to make and receive calls is a required feature while hardly any have indicated that making your phone your wallet is required.

FIG. 4 is an additional graphical representation 400 of a Cluster B and the user preferences associated therewith. As in FIG. 3, FIG. 4 illustrates that features 402-418 are listed and the responses are indicated in legend 420 as a disadvantage 420A, indifferent 420B, advantageous 420C, and required 420D. As is apparent, significantly more users of Cluster B indicated that making your phone your wallet is Required than those in Cluster A of FIG. 3.

Taking the user preferences one step further, the optimization engine 208 may utilize the user preference of the clusters in order to optimize the user experience. For instance, features that have been designated as a disadvantage may be blocked from a user device and/or given a low priority. Thus, if a user indicates that converting voicemails to text is a disadvantage, that functionality may be disabled or simply not offered as an option to the user (e.g., either disable the capability to convert a voicemail to text or simply do not present the option to the user to be able to convert the voicemail to text). This proactive action may be predicted by the optimization engine 208 of FIG. 2 as is further described in detail below.

Returning now to FIG. 2, once the clusters and user preferences are organized, that information may be used by the optimization engine 208 to identify and/or predict actions that influence user satisfaction levels. A prediction component 220 may be configured for predicting actions that influence said user satisfaction levels. A user satisfaction level, as used herein, refers generally to how a user may rate their overall user experience. The user preferences associated with each cluster assist the optimization engine 208 in knowing how a user rates certain features/experiences. The prediction component 220 may predict actions to influence user satisfaction levels by determining whether a predetermined number of actions have taken place. For example, if a predetermined number of users within a cluster have taken a particular action (e.g., uninstalling an application), then prediction component 220 may predict that the action of uninstalling the application would be a positive action for the remaining users of the cluster that have not yet taken that action. If the prediction component 220 identifies that a predetermined threshold has not yet been met (e.g., a number of users under the threshold have taken an action) then no recommended action may be needed.

Once the prediction component 220 identifies an action that may impact a user experience, instructions may be communicated by, for example, the communicating component 216 to the user device 202 or the optimization agent 202A of user device 202. In particular, the instructions may be communicated to the optimization agent 202A. Instructions may be, for example, an instruction to disable a feature, an instruction to remove visibility of the feature to a user (e.g., removing a button that converts voicemails to text if that is an undesirable feature for a user), instructions to present a notification to a user to take action such as disabling the feature, or the like. The instructions (or recommended action) are intended to avoid a negative satisfaction level and promote positive experiences.

In embodiments, if the optimization engine 208 identifies that a response is not received for a predetermined number of recommended actions that have been communicated to a user, the optimization engine 208 may determine that recommended actions should no longer be sent to the user. Alternatively, the optimization engine 208 may determine that actions should automatically be executed rather than sending a recommended action to a user.

In addition to predicting satisfaction levels, the system 200 may also predict device compatibility for a user. For example, some users associated with Device A may switch to Device B for various reasons while other users associated with Device A may switch to Device C. System 200 may be configured to evaluate user feedback regarding the device switch in order to anticipate what may be the best move for a subsequent user. For instance, the users of the cluster that switched to Device B may report that they are extremely satisfied with the switch while the users of the cluster that switched to Device C may have several negative experiences to report or, additionally, may switch to yet another device. System 200 may be able to advise a subsequent user associated with Device A that other users of his/her respective cluster have previously switched to Device B and been very satisfied while a switch to Device C may not lead to a positive experience.

Returning to FIG. 2, the optimization engine 208 further comprises the updating component 218. The updating component 218 is configured for, among other things, updating clusters, user preferences, and the like. As previously described, user behaviors are continuously monitored such that any changes are identified and, if necessary, a user may be associated with a different cluster. The updating component 218 may be configured to associate the user with a new cluster, associate the user with updated user preferences based on recent feedback, and the like.

Figure 5:
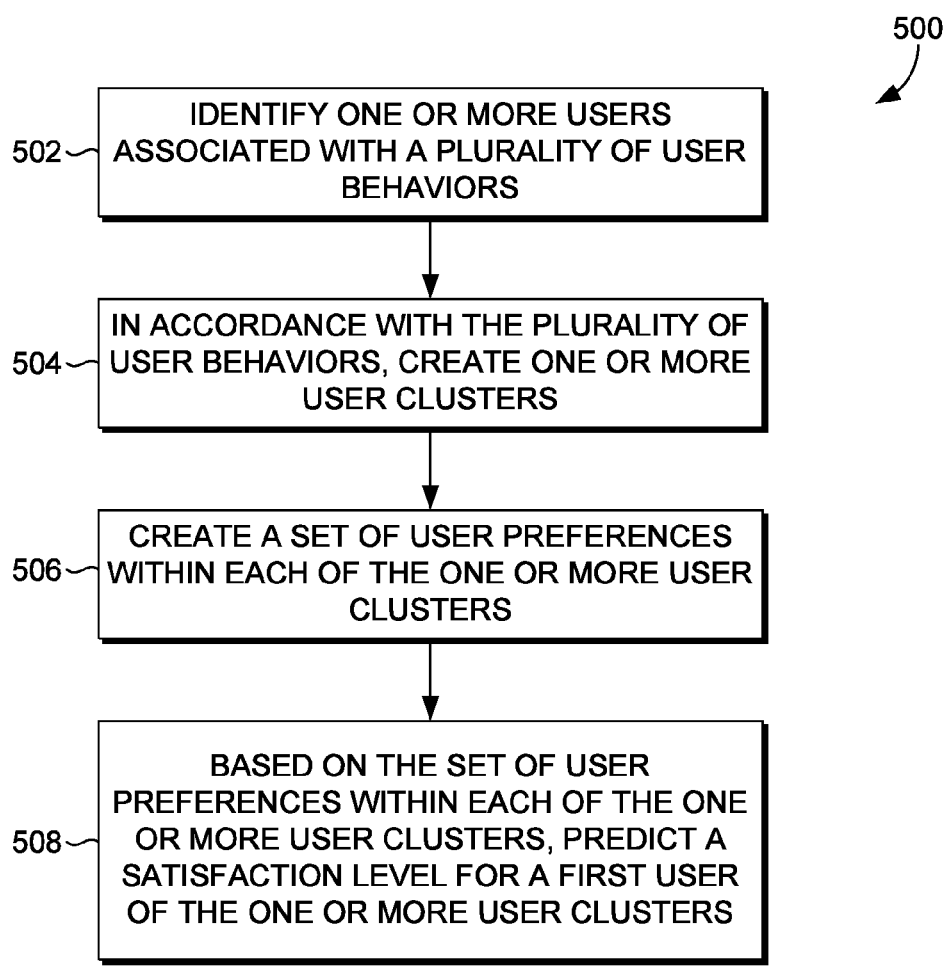
FIG. 5 provides a first exemplary method for optimizing a user experience, in accordance with an embodiment of the present invention.

Turning now to FIG. 5, a flow diagram is shown illustrating a first exemplary method 500 for optimizing a user experience. In embodiments, method 500 can be performed using an optimization engine such as the optimization engine 208 illustrated in FIG. 2.

Initially, at block 502, one or more users are identified that are associated with a plurality of user behaviors. The plurality of user behaviors is useful in order to identify one or more users that act similarly. Based on the plurality of user behaviors, one or more user clusters are created at block 504. At block 506, a set of user preferences are created within each of the one or more user clusters. The user preference may indicate features that are, for example, required, advantageous, indifferent, or disadvantageous to a user. Based on the set of user preferences within each of the one or more user clusters, a satisfaction level for a first user is predicted at block 508.

Figure 6:
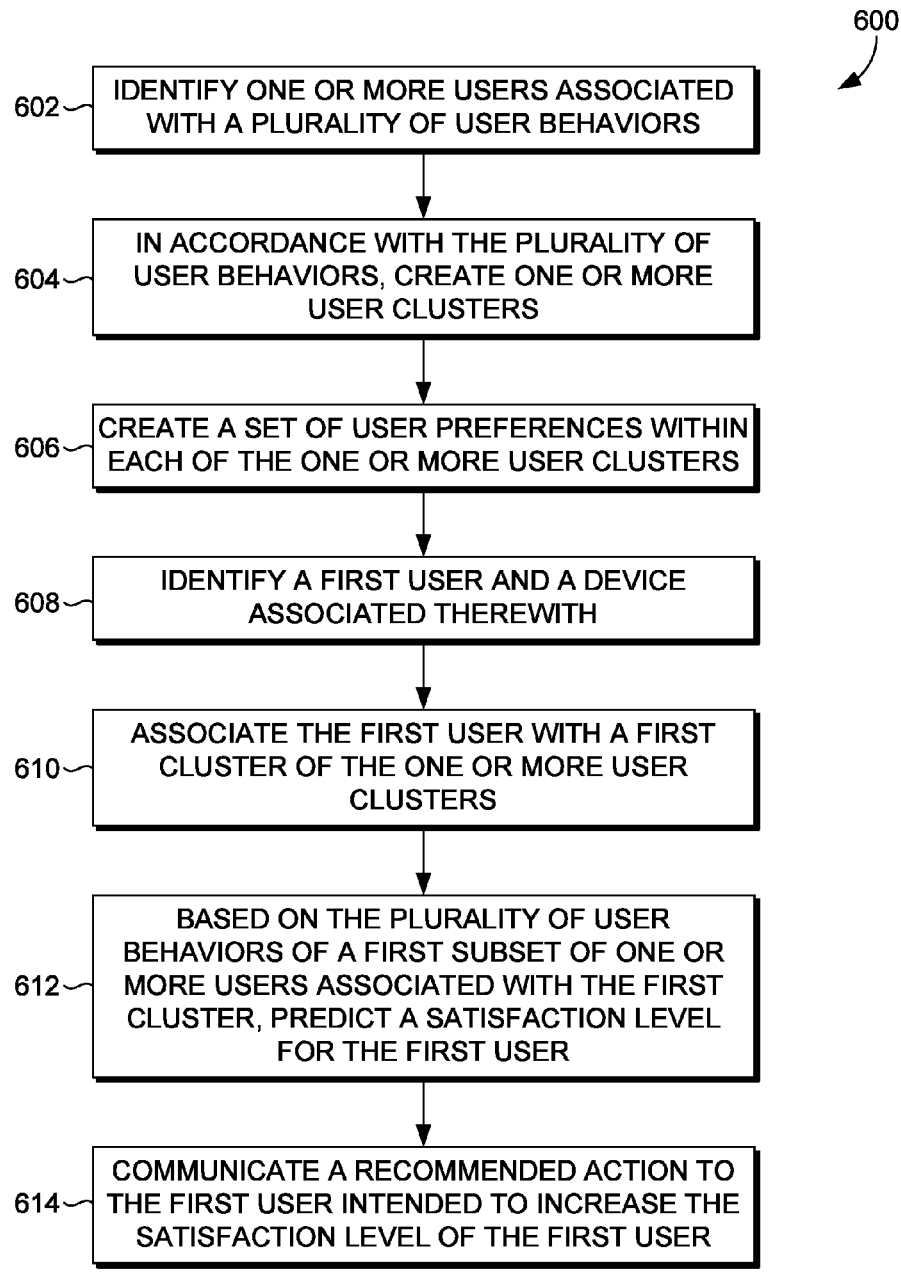
FIG. 6 provides a second exemplary method for optimizing a user experience, in accordance with an embodiment of the present invention.

Turning now to FIG. 6, a flow diagram is shown illustrating a second exemplary method 600 for optimizing a user experience, in accordance with an embodiment of the present invention. In embodiments, method 600 can be performed using an optimization engine such as the optimization engine 208 illustrated in FIG. 2.

Initially, as indicated at block 602, one or more users that are associated with a plurality of user behaviors is identified. Based on the plurality of user behaviors, one or more user clusters is created at block 604. A set of user preferences is created within each of the one or more user clusters at block 606. The set of user preferences may indicate if a feature is required, advantageous, indifferent, or disadvantageous to a user. At block 608, a first user and a device associated with the first user are identified. At block 610, the first user is associated with a first cluster of the one or more user clusters. Based on the plurality of user behaviors of a first subset of one or more users associated with the first cluster, a satisfaction level for the first user is predicted at block 612. At block 614, a recommended action is communicated to the first user, where the recommended action is intended to increase the satisfaction level of the first user.

It will be understood by those of ordinary skill in the art that the order of steps shown in the method 500 of FIG. 5 and method 600 of FIG. 6 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for optimizing a user experience, the method comprising:
   identifying one or more users associated with a plurality of user behaviors, wherein the plurality of user behaviors are actions taken with regard to mobile device features;
   in accordance with the plurality of user behaviors, creating one or more user clusters, wherein each user cluster includes a subset of the one or more users associated with a predetermined number of same user behaviors;
   creating a set of user preferences within each of the one or more user clusters, wherein each set of user preferences:
      (i) is specific to the plurality of user behaviors associated with a corresponding user cluster, and
      (ii) indicates mobile device feature preferences of the one or more users of the corresponding user cluster;
   predicting an overall user-experience satisfaction level for a first user using a first set of user preferences of a first user cluster to which the first user belongs; and
   when a negative overall user-experience satisfaction level for the first user is predicted, communicating a recommendation to the first user, wherein the recommendation provides one or more actions for the first user to take on a mobile device with regard to at least one mobile device feature, and wherein the one or more actions to take avoid the negative satisfaction level or reduce the negative satisfaction level.

2. The media of claim 1, wherein the set of user preferences are created based on one or more surveys completed by the one or more users.

3. The media of claim 1, wherein the plurality of user behaviors is continuously monitored.

4. The media of claim 1, wherein predicting a satisfaction level for a first user using a first set of user preferences of a first user cluster to which the first user belongs further comprises:
   predicting a negative satisfaction level for the first user.

5. The media of claim 1, wherein a satisfaction level is identified based on a predetermined number of users executing an action.

6. The media of claim 1, further comprising predicting device compatibility for at least one of the one or more users.

7. The media of claim 1, wherein the one or more user clusters are reorganized based on updated user behaviors.

8. One or more non-transitory computer-readable storage media having computer-executable instructions embodied thereon that, when executed, perform a method for optimizing a user experience, the method comprising:
   identifying one or more users associated with a plurality of user behaviors wherein the plurality of user behaviors are actions taken with regard to mobile device features;
   in accordance with the plurality of user behaviors, creating one or more user clusters, wherein each user cluster includes a subset of the one or more users associated with a predetermined number of the same user behaviors;
   creating a set of user preferences within each of the one or more user clusters, wherein each set of user preferences:
      (i) is specific to the plurality of user behaviors associated with a corresponding user cluster, and
      (ii) indicates mobile device feature preferences of the one or more users of the corresponding user cluster;
   identifying a first user and a device associated therewith;
   associating the first user with a first cluster of the one or more user clusters;
   based on the plurality of user behaviors of a first subset of one or more users associated with the first cluster, predicting an overall user-experience satisfaction level for the first user associated with the first cluster; and when a negative overall user-experience satisfaction level is predicted for the first subset of one or more users associated with the first cluster, communicating a recommended action to the first user associated with the first cluster to take on a mobile device with regard to at least one mobile device feature, wherein the recommended action to take avoids the negative overall user-experience satisfaction level or reduces the negative overall user-experience satisfaction level.

9. The media of claim 8, further comprising identifying a rate plan associated with the first user.

10. The media of claim 9, wherein the first user is associated with the first cluster based on the device associated with the first user, the rate plan associated with the first user, or a combination thereof.

11. The media of claim 8, wherein the first user is associated with the first cluster based on identifying a first set of users associated with the first cluster being associated with one or more user behaviors that are also associated with the first user.

12. The media of claim 8, further comprising:
identifying that a response to a predetermined number of recommendation actions has not been received from the first user; and
based on identifying that a response to the predetermined number of recommendation actions has not been received from the first user, ceasing communication of recommendation actions to the first user.

13. The media of claim 12, further comprising upon identifying that recommendation actions are not to be communicated to the first user, automatically executing an action for the first user.

14. A system for optimizing a user experience, the system comprising:
a computing device associated with one or more processors and one or more computer storage media; and
an optimization engine comprising:
a manager component configured for managing an optimization system and distributing user information to one or more other components of the optimization system, wherein the user information includes user actions with regard to mobile user device features;
an analysis component for:
analyzing the user information;
providing recommended cluster groupings of one or more users associated with the user information; and
providing recommendation actions to maintain user satisfaction of the one or more users, wherein the recommendation actions are actions to be taken by the one or more users with regard to a mobile user device feature to reduce or prevent negative overall user-experience satisfaction;
a communicating component for communicating the recommendation actions to one or more mobile user devices;
an updating component for updating the cluster groupings based on updated user information; and
a prediction component for predicting actions to take on a mobile user device with regard to a mobile user device feature to affect overall user-experience satisfaction, wherein when a number of users within a first cluster grouping take a particular action with regard to a same mobile user device feature, the particular action is predicted to positively affect overall user-experience satisfaction of remaining users of the first cluster grouping that have not taken the particular action.

15. The system of claim 14, further comprising a monitoring component for continuously monitoring the optimization system such that changes in user information are identified.

16. The system of claim 14, further comprising a user device including an optimization agent for receiving instructions from the optimization engine.

17. The system of claim 16, wherein the optimization engine communicates the recommendation actions to the optimization agent, and wherein the recommendation actions include deleting an application from the user device.

18. The system of claim 16, wherein the optimization engine communicates the recommendation actions to the optimization agent, and wherein the recommendation actions are presented to a user via an interface of the user device.

19. The system of claim 14, wherein the prediction component predicts user satisfaction based on a predetermined number of users executing a same action.

20. The system of claim 19, wherein the prediction component is further configured to predict device compatibility for one or more users.

* * * * *